(12) United States Patent
Liu et al.

(10) Patent No.: US 9,779,765 B1
(45) Date of Patent: Oct. 3, 2017

(54) PERPENDICULAR MAGNETIC RECORDING WRITER HAVING IMPROVED PERFORMANCE AND WIDE AREA TRACK ERASURE RELIABILITY

(71) Applicant: Western Digital (Fremont), LLC, Fremont, CA (US)

(72) Inventors: Feng Liu, San Ramon, CA (US); Zhanjie Li, Pleasanton, CA (US); Peng Luo, San Ramon, CA (US); Zhigang Bai, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/245,850

(22) Filed: Aug. 24, 2016

(51) Int. Cl.
  *G11B 5/127* (2006.01)
  *G11B 5/31* (2006.01)
  *G11B 5/024* (2006.01)

(52) U.S. Cl.
  CPC ............ *G11B 5/3116* (2013.01); *G11B 5/024* (2013.01); *G11B 5/1278* (2013.01); *G11B 5/315* (2013.01); *G11B 5/3143* (2013.01)

(58) Field of Classification Search
  CPC ... G11B 5/1278; G11B 5/3116; G11B 5/3143; G11B 5/315
  USPC .......................................... 360/125.06, 125.1
  See application file for complete search history.

(56) References Cited

U.S. PATENT DOCUMENTS

| | | | |
|---|---|---|---|
| 7,538,976 B2 | 5/2009 | Hsiao et al. | |
| 7,768,741 B2 | 8/2010 | Feng | |
| 8,031,434 B2 * | 10/2011 | Le | G11B 5/3163 360/125.08 |
| 8,035,930 B2 * | 10/2011 | Takano | G11B 5/1278 360/319 |
| 8,085,498 B2 | 12/2011 | Bai et al. | |
| 8,098,456 B2 | 1/2012 | Lim et al. | |
| 8,233,235 B2 | 7/2012 | Chen et al. | |
| 8,264,792 B2 | 9/2012 | Bai et al. | |
| 8,537,494 B1 | 9/2013 | Pan et al. | |
| 8,804,281 B1 * | 8/2014 | Tang | G11B 5/1278 360/125.09 |
| 8,824,102 B2 | 9/2014 | Sasaki et al. | |
| 8,917,480 B2 | 12/2014 | Liu et al. | |
| 9,111,550 B1 | 8/2015 | Liu et al. | |

(Continued)

OTHER PUBLICATIONS

Feng Liu et al., Magnetic Recording Write Apparatus Having a Pole and a Magnetic Separation Layer, U.S. Appl. No. 15/199,793, filed Jun. 30, 2016.

(Continued)

*Primary Examiner* — Jefferson Evans
(74) *Attorney, Agent, or Firm* — John D. Henkhaus

(57) ABSTRACT

A magnetic writer includes a high magnetic moment write pole layer on a main write pole, the write pole layer including a proximal end recessed from the air bearing surface, and a Wide Area Track Erasure (WATER) reservoir recessed from the proximal end of the write pole layer and transverse to a longitudinal direction of the main write pole. The write pole layer may be conformal in shape to, but have smaller dimensions relative to, the main write pole, such that a distance between their outer surfaces is generally constant in a flare region. The WATER reservoir width, in a cross-track direction, may be greater than or equal to the maximum width of the main write pole.

23 Claims, 4 Drawing Sheets

(56) References Cited

U.S. PATENT DOCUMENTS

| | | | |
|---|---|---|---|
| 9,111,564 B1 | 8/2015 | Liu et al. | |
| 9,245,562 B1 | 1/2016 | Liu et al. | |
| 9,286,919 B1 | 3/2016 | Liu et al. | |
| 9,396,741 B1* | 7/2016 | Tian | G11B 5/315 |
| 9,558,763 B1* | 1/2017 | Luo | G11B 5/1278 |
| 2005/0105215 A1* | 5/2005 | Matono | G11B 5/312 |
| | | | 360/125.13 |
| 2007/0133129 A1* | 6/2007 | Matono | G11B 5/3116 |
| | | | 360/317 |
| 2014/0078619 A1* | 3/2014 | Song | G11B 5/1278 |
| | | | 360/125.03 |
| 2015/0002959 A1* | 1/2015 | Basu | G11B 5/11 |
| | | | 360/125.03 |
| 2015/0036470 A1* | 2/2015 | Balamane | G11B 5/3116 |
| | | | 369/13.33 |
| 2015/0194169 A1* | 7/2015 | Yamaguchi | G11B 5/1278 |
| | | | 360/235.4 |
| 2016/0133276 A1* | 5/2016 | Ukita | G11B 5/1278 |
| | | | 360/234.6 |

OTHER PUBLICATIONS

Feng Liu et al., Magnetic Recording Write Apparatus Having a Stepped Conformal Trailing Shield, U.S. Appl. No. 14/953,982, filed Nov. 30, 2015.

Feng Liu et al., Magnetic Recording Write Apparatus Having a Pole Having an Aspect Ratio Greater Than One and An Auxiliary Pole, U.S. Appl. No. 15/097,182, filed Apr. 12, 2016.

* cited by examiner

PERPENDICULAR MAGNETIC RECORDING WRITER HAVING IMPROVED PERFORMANCE AND WIDE AREA TRACK ERASURE RELIABILITY

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

With perpendicular magnetic recording (PMR) based HDDs, a typical PMR head includes a trailing write pole, a trailing return pole or opposing pole magnetically coupled to the write pole, and an electrically conductive magnetizing coil surrounding the write pole. The bottom of the return/opposing pole has a surface area greatly exceeding the surface area of the tip of the write pole. Write current is passed through the write coil to create magnetic flux within the write pole. The magnetic flux passes from the write pole tip, through the hard magnetic recording track on the media, into the soft under-layer in the magnetic media, and across to the return/opposing pole to complete perpendicular writing process.

Increasing areal density (a measure of the quantity of information bits that can be stored on a given area of disk surface) is one of the ever-present goals of hard disk drive design evolution. As areal density increases, the recording data rate preferably increases accordingly. For example, the recording data rate for a 3.5" 7200 RPM desktop product may achieve greater than 2.4 Gb/s. Such a high data rate requirement on the PMR writer demands a fast writer with a much reduced write field rise time for recording at high frequencies. Meanwhile, the high data rate PMR writer design also needs to meet stringent reliability requirements, such as requirements associated with Wide Area Track Erasure (WATER). The WATER reliability issue is especially important for short yoke length PMR writer configurations, which intrinsically have worse WATER margins. Therefore, a dynamically fast writer with improved off track erasure or WATER capability may be desirable.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a magnetic writer are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of Illustrative Operating Environments

Embodiments may be used in the context of a magnetic recording head in a hard-disk drive (HDD) data storage device. Thus, in accordance with an embodiment, a plan view illustrating an HDD 100 is shown in FIG. 1 to illustrate an operating environment example.

Figure 1:
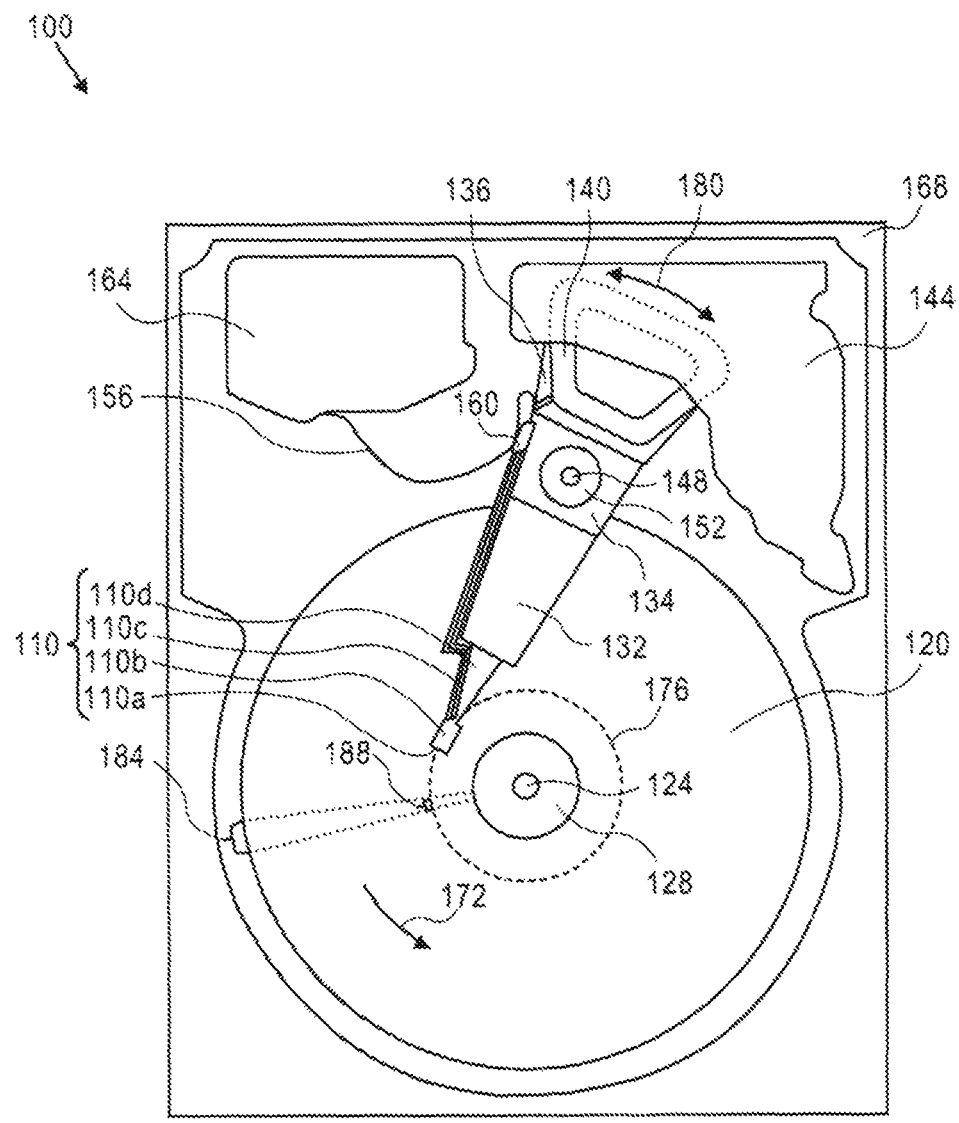
FIG. 1 is a plan view illustrating a hard disk drive, according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or actuator comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam 110*d* to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As discussed, a high data rate requirement on a PMR writer demands a fast writer with much reduced write field rise time for recording at high frequencies. Meanwhile, the high data rate PMR writer design also needs to meet stringent reliability requirements, such as requirements associated with Wide Area Track Erasure (WATER). The WATER reliability issue is especially important for short yoke length PMR writer configurations, which intrinsically have worse WATER margins. This is due, at least in part, to the presence of side shields, which are considered important in overcoming adjacent track interference (ATI). That is, the side shields are activated by write flux leaking out of the main pole during writing operations, which can result in WATER. One possible approach is to simply fabricate a PMR writer with a thicker main pole, which may improve on-track writability, but at the expense of further off-track WATER performance degradation. Therefore, a dynamically fast writer with improved off track erasure or WATER capability may be beneficial.

Figure 2:
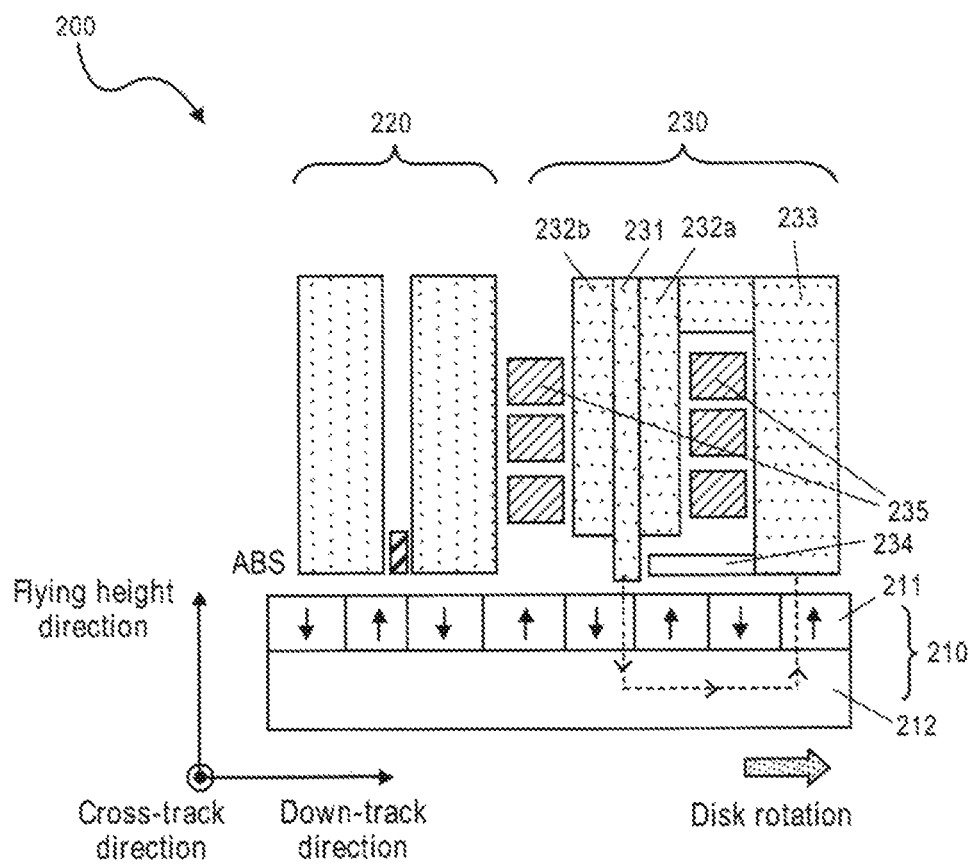
FIG. 2 is a cross-sectional side view illustrating a perpendicular magnetic recording (PMR) head, according to an embodiment.

FIG. 2 is a cross-sectional side view of a perpendicular magnetic recording (PMR) head, according to an embodiment of the invention. FIG. 2 illustrates a PMR head 200 in recording relation with a perpendicular magnetic recording medium such as disk 210. PMR head 200 comprises a reader 220 and a writer 230.

PMR writer 230 comprises a main pole 231, a first auxiliary pole 232b and a second auxiliary pole 232a (on opposing sides of main pole 231), a writer coil 235, a magnetic wrap-around shield (WAS) 234, and a return pole 233. Main pole 231 is exposed at the air bearing surface (ABS), faces disk 210, and forms recording bits by reversing the magnetization of magnetic particles in the disk 210. The first and second auxiliary poles 232b, 232a, respectively, are magnetically connected to the main pole 231 but are not typically exposed at the ABS. Writer coil 235 is for exciting the main pole 231 and the auxiliary poles 232a, 232b, i.e., the electricity flowing through the coil 235 produces a magnetic field. The WAS 234 is positioned at the periphery of the main pole 231 tip for assisting with focusing the magnetic flux emitting from main pole 231, and a return pole 233 is positioned for providing means for the magnetic flux to return to the writer 230 structure to complete the magnetic circuit.

Electrical pulses are sent to the coil 235 of writer 230 with different patterns of positive and negative currents and the current in the coil 235 induces a magnetic field across the gap between the main pole 231 and the disk 210, which in turn magnetizes a small area on the recording medium, disk 210. A strong, highly concentrated magnetic field emits from the main pole 231 in a direction perpendicular to the disk 210 surface, magnetizing the magnetically hard recording layer 211. The resulting magnetic flux then travels through the soft underlayer 212, returning to the return pole 233 where it is sufficiently spread out and weak that it will not erase the signal recorded by the main pole 231 when it passes back through the magnetically hard recording layer 211 on its way back to the return pole 233.

The writer main pole 231 switching characteristics directly determine the dynamic rise time property in PMR systems. Thus, PMR main pole 231 designs may address the following performance and reliability challenges: (a) dynamic fast response, i.e., small rise time and fast saturation; (b) steady state domain lock up (when write current is off); and (c) dynamic Wide Area Track Erasure (WATER). However, improvements in dynamic writer performance as seen in error margin (EM) or signal to noise ratio (SNR) often result in degradation of off track WATER reliability. Embodiments of PMR writer designs described herein may improve writer performance, such as write field rise time and/or saturation (thus error margin), while at least maintaining off track WATER reliability margin.

Recessed Main Pole Layer for Magnetic Writer

Figure 3:
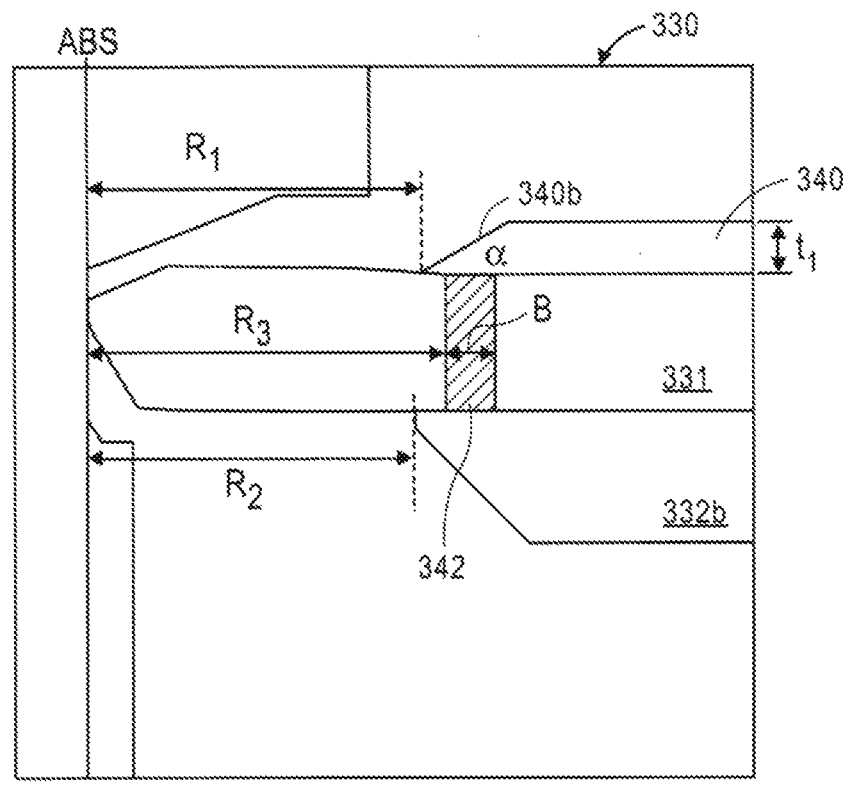
FIG. 3 is a cross-sectional side view illustrating a PMR writer, according to an embodiment.

FIG. 3 is a cross-sectional side view illustrating a PMR writer, according to an embodiment. Writer 330 comprises a main write pole 331 extending to an air bearing surface (ABS) in a longitudinal direction, a first auxiliary pole 332b positioned on one side of the main write pole 331, and an additional high magnetic moment write pole layer 340 positioned on the main write pole 331 on the side opposing the auxiliary pole 332b. The write pole layer 340 is composed of a "high magnetic moment" material. For example, and according to an embodiment, the write pole layer 340 may have a magnetic moment as high as (i.e., substantially equivalent to) the magnetic moment of the material of which the main write pole 331 is composed (for a non-limiting example, able to generate a magnetic flux density B≅2.4 T). The write pole layer 340 comprises a proximal end toward or near the ABS, which is recessed a particular distance ($R_1$) from the ABS. Upon write current excitation in the coil (e.g., coil 235 of FIG. 2), the main write pole 331, the auxiliary pole 332b (and an opposing auxiliary pole such as auxiliary pole 232a of FIG. 2, if present), and write pole layer 340 function collectively to create magnetic flux for purposes of writing on corresponding media.

According to an embodiment, the distance $R_1$ between the proximal end of the write pole layer 340 and the ABS is in a range of 0.2-1.5 micrometers (μm). A distance $R_1$ near 0.55 μm has been found to produce suitably effective results in view of other component dimensions discussed elsewhere herein. For comparison, with an $R_1$ of around 0.55 μm, the distance $R_2$ between the proximal end of the auxiliary pole 332b and the ABS may be around 0.45 μm, for example. Hence, according to an embodiment, the write pole layer 340 is recessed farther from the ABS than is the opposing auxiliary pole 332b. Further, according to an embodiment, a writer 330 comprising a second auxiliary pole (such as auxiliary pole 232a of FIG. 2) is contemplated, where the second auxiliary pole is positioned on the same side of the main write pole 331 as the write pole layer 340, and comprises a proximal end recessed from the ABS a greater distance than the write pole layer 340 is recessed from the ABS. For a non-limiting example, the second auxiliary pole may be recessed near 2.0 μm from the ABS, and may be around 0.6 μm thick in the down-track direction.

Figure 4:
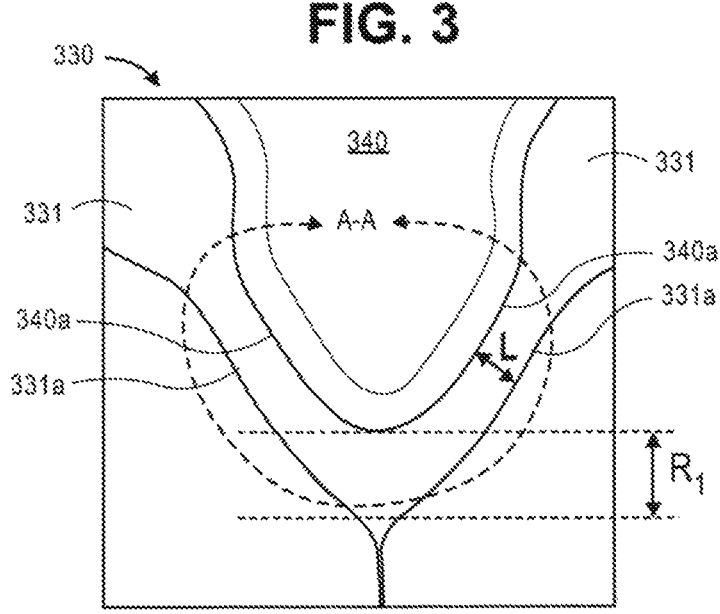
FIG. 4 is a top view illustrating a PMR writer including a recessed main pole layer on the main pole, according to an embodiment.

According to an embodiment, the write pole layer 340 is conformal to, but undersized from, the shape of main write pole 331. This is best envisioned from FIG. 4, where FIG. 4 is a top view illustrating a PMR writer including a recessed main pole layer on the main pole, according to an embodiment. FIG. 4 depicts the writer 330 comprising the main write pole 331 with the write pole layer 340 deposited thereon (with the side gap and side shields not shown here, for purposes of clarity). According to an embodiment, the main write pole 331 comprises a first top profile shape with a first outer surface 331a in a flare region A-A, similar to as depicted in FIG. 4. Similarly, write pole layer 340 comprises a second top profile shape encompassed by the first top profile shape, and with a second outer surface 340a in at least a portion of the flare region A-A, similar to as depicted in FIG. 4. According to an embodiment, the distance L between the first outer surface 331a of the main write pole 331 and the second outer surface 340a of write pole layer 340 is substantially constant in at least a portion of the flare region A-A. Hence, as depicted, the shape of write pole layer 340 is considered substantially conformal to, but undersized from, the shape of the main write pole 331. According to an embodiment, the distance L between the first outer surface 331a of the main write pole 331 and the second outer surface 340a of write pole layer 340 is in a range of 0.0-0.5 micrometers (μm). A distance L near 0.20 μm has been found to produce suitably effective results in view of other component dimensions discussed elsewhere herein. Another way of looking at this feature is that the respective flare angle (i.e., the angle, from the cross-track direction, of each respective outer surface 331a, 340a in the flare region) for each of the main write pole 331 and the write pole layer 340 are substantially equivalent, according to an embodiment.

With reference to FIG. 3, the write pole layer 340 is configured with a tapering angle α from the longitudinal direction (e.g., in an up-track direction) at its proximal end, as depicted. While the write pole layer 340 is depicted with a proximal angled (α) surface 340b meeting or intersecting with the top surface of the main write pole 331, according to an embodiment, the proximal end of the write pole layer 340 may have a substantially vertical surface that meets with or intersects with the top surface of the main write pole 331, from which the angled surface 340b extends at angle α. According to an embodiment, the tapering angle α from the longitudinal direction is in a range of 15-60 degrees. A tapering angle α near 35 degrees has been found to produce suitably effective results in view of other component dimensions discussed elsewhere herein. According to an embodiment, the tapering angle α of the proximal end of the write pole layer 340 is substantially equivalent to the tapering angle of the proximal end of the write main pole 331.

With reference to FIG. 3, the write pole layer 340 has a thickness $t_1$ (in the down-track direction). According to an embodiment, the thickness $t_1$ of the write pole layer 340 is in a range of 20-150 nanometers (nm). A thickness $t_1$ near 80 nm has been found to produce suitably effective results in view of other component dimensions discussed elsewhere herein.

Writer 330 further comprises a Wide Area Track Erasure (WATER) reservoir element 342 ("WATER reservoir 342") recessed from the proximal end of the write pole layer 340 in the longitudinal (flying height) direction, and configured substantially transverse to the longitudinal direction (e.g., "into the paper" of FIG. 3). According to an embodiment, and as depicted in FIG. 3, the WATER reservoir 342 may extend in the down-track direction a distance substantially equivalent to the thickness of the main write pole 331. However, the precise size of the WATER reservoir 342 in each direction may vary from implementation to implementation and, therefore, a WATER reservoir 342 that is different from the thickness of the main write pole 331 is contemplated.

Figure 5:
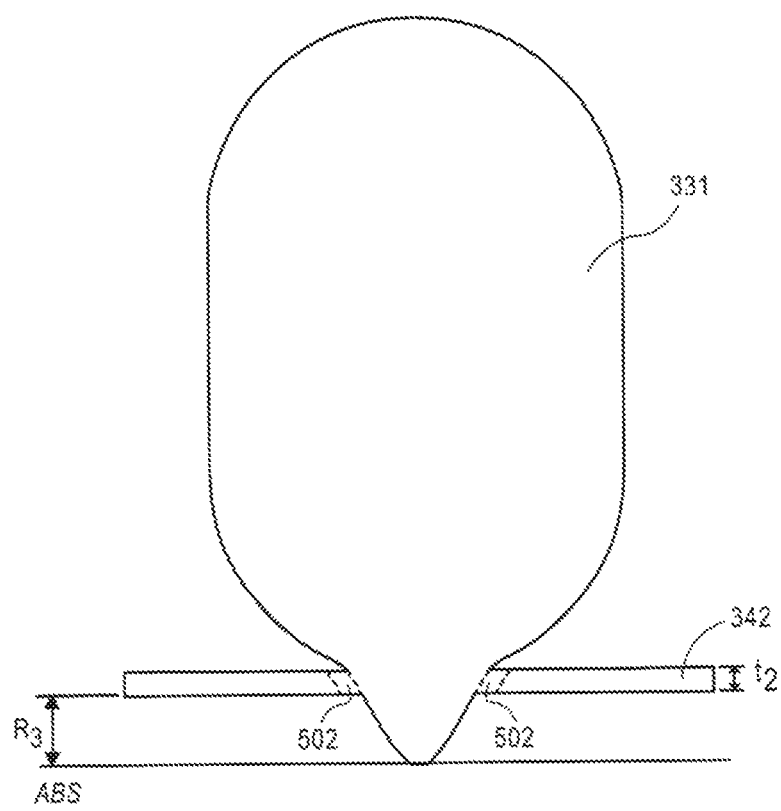
FIG. 5 is a top view illustrating a PMR writer main pole and a WATER reservoir, according to an embodiment.

FIG. 5 is a top view illustrating a PMR writer main pole and a WATER reservoir, according to an embodiment. As depicted in FIGS. 3 and 5, the WATER reservoir 342 is recessed from the ABS a distance $R_3$. According to an embodiment, the WATER reservoir 342 is recessed from the ABS a distance $R_3$ in a range of 0.5-1.7 micrometers (μm). A distance $R_3$ near 1.0 μm has been found to produce suitably effective results in view of other component dimensions discussed elsewhere herein.

According to an embodiment, and as depicted in FIG. 5, the WATER reservoir 342 has a width, in the cross-track direction which is transverse to the longitudinal (or flying height) direction, that is greater than or equal to a maximum width, in the cross-track direction, of the main write pole 331. Such a configuration for the WATER reservoir 342 facilitates, for example, its ability to affect the flux that may otherwise undesirably leak from the main write pole 331 into the side shields and thereby activating the side shields, and thus negatively affecting WATER, as previously described.

With reference to FIG. 5, the WATER reservoir 342 has a thickness $t_2$ in the longitudinal (or flying height) direction. According to an embodiment, the thickness $t_2$ of the WATER reservoir 342 is in a range of 0.1-0.7 micrometers (μm). A thickness $t_2$ near 0.3 μm has been found to produce suitably effective results in view of other component dimensions discussed elsewhere herein.

According to an embodiment, the WATER reservoir 342 is structurally connected to, and composed of a same material as, the main write pole 331, as depicted in FIG. 5. According to an alternative embodiment, the WATER reservoir 342 is structurally disconnected from the main write pole 331. As such, there may be a gap 502 between surfaces of the WATER reservoir 342 and the main write pole 331 (depicted as gap 502 between the dashed lines of FIG. 5), filled with a different material than that of the WATER reservoir 342 and/or the main write pole 331. According to an embodiment, the WATER reservoir 342 is structurally disconnected from, and composed of a different material than, the main write pole 331.

The foregoing PMR writer embodiments with an additional piece of high magnetic moment main pole layer 340 in combination with an aggressive WATER reservoir 342 may enable a high data rate, short yoke length (e.g., 2×2 or fewer coil turns) writer platform with improved saturation speed/reduced field rise time (e.g., at least in part by way of the high moment main pole layer 340) without mitigating off track WATER reliability (e.g., at least in part by way of the aggressive WATER reservoir 342). Note that a combination of the foregoing features, i.e., a stack comprising the auxiliary pole 332b, the main write pole 331 with a WATER reservoir 342, and the write pole layer 340 is likely to have demonstrably better performance collectively than each feature otherwise would separately, especially in view of the foregoing component dimensions.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A magnetic writer comprising:
   a magnetic write pole extending to an air bearing surface in a longitudinal direction;
   a magnetic return pole, magnetically connected with said write pole in a region removed from said air bearing surface;
   a high magnetic moment write pole layer on said write pole and comprising a proximal end recessed from said air bearing surface;
   a wide area track erasure (WATER) reservoir element recessed from said proximal end of said write pole layer in said longitudinal direction, and said reservoir element extending substantially transverse to said longitudinal direction; and
   a write coil arranged around said write pole and said write pole layer so as to induce a magnetic flux in said write pole and said write pole layer when electrical current flows through said write coil.

2. The magnetic writer of claim 1:
   wherein said write pole comprises a first top profile shape with a first outer surface in a flare region;
   wherein said write pole layer comprises a second top profile shape encompassed by said first top profile shape and with a second outer surface in at least a portion of said flare region;
   wherein a distance between said first outer surface and said second outer surface is substantially constant in said portion of said flare region.

3. The magnetic writer of claim 2,
   wherein said distance between said first outer surface and said second outer surface, in a direction normal to said first and second outer surfaces, is in a range consisting of 0.0-0.5 micrometers (μm).

4. The magnetic writer of claim 1,
wherein the magnetic moment of said write pole and the magnetic moment of said write pole layer are substantially equivalent.

5. The magnetic writer of claim 1,
wherein said proximal end of said write pole layer is recessed from said air bearing surface in a range consisting of 0.2-1.5 micrometers (μm).

6. The magnetic writer of claim 1,
wherein said write pole layer has a thickness in a downtrack direction in a range consisting of 20-150 nanometers (nm).

7. The magnetic writer of claim 1:
wherein said write pole layer comprises a tapering angle from said longitudinal direction in an up track direction at said proximal end;
wherein said tapering angle is in a range consisting of 15-60 degrees.

8. The magnetic writer of claim 1,
wherein said WATER reservoir is recessed from said air bearing surface in a range consisting of 0.5-1.7 micrometers (μm).

9. The magnetic writer of claim 1,
wherein said WATER reservoir has a width, in a cross-track direction transverse to said longitudinal direction, greater than or equal to a maximum width of said write pole.

10. The magnetic writer of claim 1,
wherein said WATER reservoir has a thickness, in said longitudinal direction, in a range consisting of 0.1-0.7 micrometers (μm).

11. The magnetic writer of claim 1,
wherein said WATER reservoir is structurally connected to, and composed of a same material as, said write pole.

12. The magnetic writer of claim 1,
wherein said WATER reservoir is structurally disconnected from said write pole.

13. The magnetic writer of claim 1, further comprising:
an auxiliary pole on a same side of said write pole as said write pole layer and comprising a proximal end recessed from said air bearing surface a greater distance than said write pole layer is recessed from said air bearing surface.

14. A data storage device comprising:
a magnetic recording disk rotatably mounted on a spindle;
a read-write head slider configured to read from and to write to said magnetic recording disk; and
a voice coil actuator configured to move said head slider to access portions of said magnetic recording disk;
wherein said head slider comprises a magnetic writer comprising:
 a magnetic write pole extending to an air bearing surface in a longitudinal direction;
 a high magnetic moment write pole layer on said write pole and comprising a proximal end recessed from said air bearing surface; and
 a wide area track erasure (WATER) reservoir element recessed from said proximal end of said write pole layer in said longitudinal direction, and said reservoir element extending substantially transverse to said longitudinal direction.

15. The data storage device of claim 14:
wherein said write pole comprises a first top profile shape with a first outer surface in a flare region;
wherein said write pole layer comprises a second top profile shape encompassed by said first top profile shape and with a second outer surface in at least a portion of said flare region;
wherein a distance between said first outer surface and said second outer surface is substantially constant in said portion of said flare region.

16. The data storage device of claim 15,
wherein said distance between said first outer surface and said second outer surface, in a direction normal to said first and second outer surfaces, is in a range consisting of 0.0-0.5 micrometers (μm).

17. The data storage device of claim 14,
wherein the magnetic moment of said write pole and the magnetic moment of said write pole layer are substantially equivalent.

18. The data storage device of claim 14,
wherein said proximal end of said write pole layer is recessed from said air bearing surface in a range consisting of 0.2-1.5 micrometers (μm).

19. The data storage device of claim 14,
wherein said write pole layer has a thickness in a downtrack direction in a range consisting of 20-150 nanometers (nm).

20. The data storage device of claim 14:
wherein said write pole layer comprises a tapering angle from said longitudinal direction in an up track direction at said proximal end;
wherein said tapering angle is in a range consisting of 15-60 degrees.

21. The data storage device of claim 14,
wherein said WATER reservoir is recessed from said air bearing surface in a range consisting of 0.5-1.7 micrometers (μm).

22. The data storage device of claim 14,
wherein said WATER reservoir has a width, in a cross-track direction transverse to said longitudinal direction, greater than or equal to a maximum width of said write pole.

23. The data storage device of claim 14,
wherein said WATER reservoir has a thickness, in said longitudinal direction, in a range consisting of 0.1-0.7 micrometers (μm).

* * * * *